2 Sheets—Sheet 1.

T. S. SPERRY.

Pillow, Bolster, Mattress, &c.

No. 8,722. Reissued May 20, 1879.

*Witnesses*

K. Newell

James H. Hunter

*Inventor*

Timothy S. Sperry

N. PETERS, PHOTO-LITHOGRAPHER, WASHINGTON, D. C.

2 Sheets—Sheet 2.

T. S. SPERRY.

Pillow, Bolster, Mattress, &c.

No. 8,722. Reissued May 20, 1879.

Witnesses:
K. Newell
James A. Hunter

Inventor:
Timothy S. Sperry

N. PETERS, PHOTO-LITHOGRAPHER, WASHINGTON, D. C.

UNITED STATES PATENT OFFICE.

TIMOTHY S. SPERRY, OF BROOKLYN, NEW YORK.

IMPROVEMENT IN PILLOWS, BOLSTERS, MATTRESSES, &c.

Specification forming part of Letters Patent No. 125,851, dated April 16, 1872; Reissue No. 8,722, dated May 20, 1879; application filed July 16, 1878.

*To all whom it may concern:*

Be it known that I, TIMOTHY S. SPERRY, of the city of Brooklyn, in the State of New York, have invented certain new and useful Improvements in Pillows, Bolsters, Mattresses, and similar articles; and declare the following to be a full, clear, and exact description of the invention, reference being had to the accompanying drawings, forming a part of this specification.

My invention relates to upholstered spring pillows, bolsters, &c.; and it consists, first, in a spring shell or frame composed of a series of spiral springs, the one spring being wound spirally in the opposite direction to the other, but so as to be attached thereto or intertwined therewith, and so that the two spirals so connected and secured together by any of the well-known methods shall form a support to each other, when such shell or frame is supported on the interior thereof by vertical spiral springs.

Figure 1:
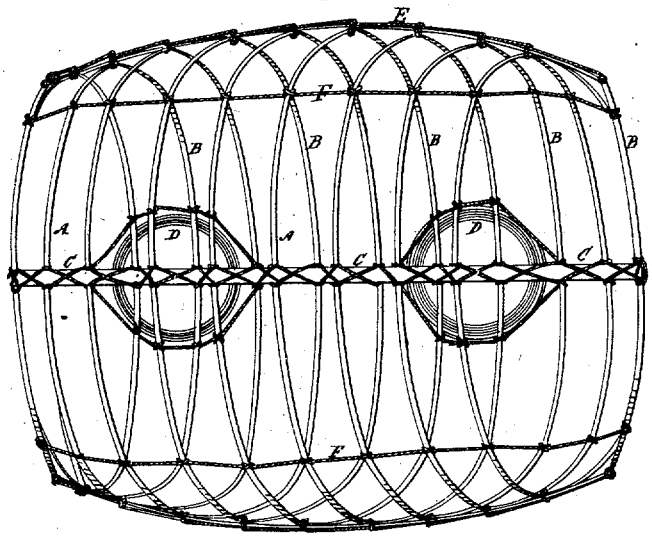
Figure 2:
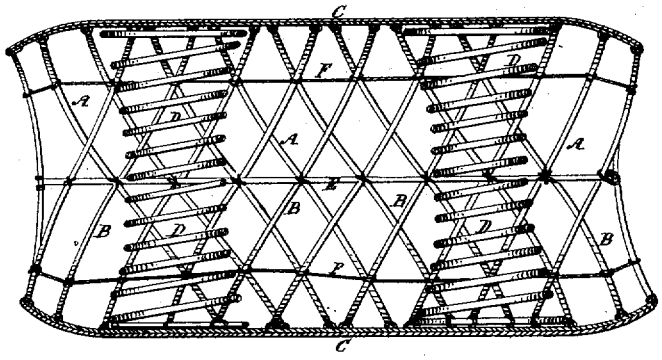
Figure 3:
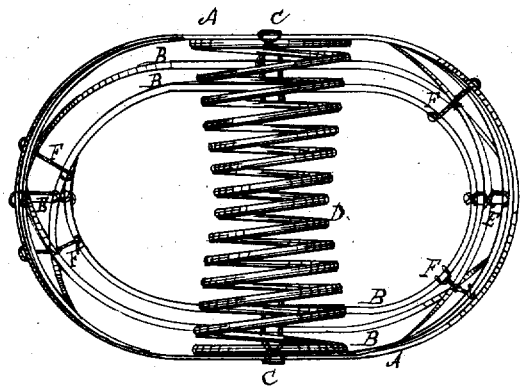

In the accompanying drawings, Figure 1 represents a top view of the shell or skeleton of a pillow embracing my invention. Fig. 2 represents a vertical longitudinal section of the same, and Fig. 3 represents a vertical cross-section thereof.

The shell or frame may be made of one continuous spring; but I prefer to make it of separate and distinct springs A B, wound spirally upon a former, one spring being so wound in one direction and the other in the opposite direction, and connected at their upper and lower sides to longitudinal stay-springs C by cords, as shown in Fig. 1, at the junction of each coil with the stay-springs, and thus afford longitudinal bracing to the shell. They are wound spirally from one end to the other, so as to form a series of bows, loops, or ovals, and united together at the ends of the shells in any suitable manner, leaving the ends of the skeleton shell open, as shown in Figs. 2 and 3 of the drawings.

Within the center of the spring shell or web are arranged a series of vertical springs, D, which I prefer to make flaring from about the middle of their length toward each end, and united to the inner sides of the top and bottom of the outer shell by lacing the outer strands of said vertical springs D to the longitudinal stays C and coils of the outer shell. This arrangement affords additional bracing to the outer shell, and, moreover, renders the pillow light and uniform in its yielding, preventing the sinking at one side or the other, and the consequent formation of ridges at the sides.

As an additional security against any tendency to longitudinal yielding of the shell, I arrange side spring-stays E to the outer shell, and also connect the outer springs, A and B, by cords F, wound around them at their junction, thus completely bracing the shell without interfering with its capacity to yield vertically with a gentle elasticity under pressure, the vertical springs D forming a sufficient support to the outer spiral coils for that purpose.

The springs may be made of any suitable material and strength, and they may be galvanized, if desired, to prevent corroding.

I make the outer shell or spring-coils upon a former, such as that patented to me February 13, 1872, and the interior supporting-springs are inserted and secured within the shell so formed in the best manner to produce the best effect.

The pillow or bolster or other article thus constructed is upholstered in any suitable manner, to give external softness to the shell.

My improvement can be applied to beds by arranging a series of internal vertical springs in rows, and may also be applied to seats of any description.

When applied in the construction of pillows and bolsters the outer shell has an oval form, as shown in Fig. 3.

I claim—

A spring shell or frame composed of a series of springs, each spring being wound spirally in an opposite direction to the other, with such shell or frame supported on the interior thereof by vertical spiral springs, substantially as described.

TIMOTHY S. SPERRY.

Witnesses:

JAMES H. HUNTER,

K. NEWELL.